June 27, 1933.  F. S. BARKS  1,916,185
FITTING
Filed June 17, 1929
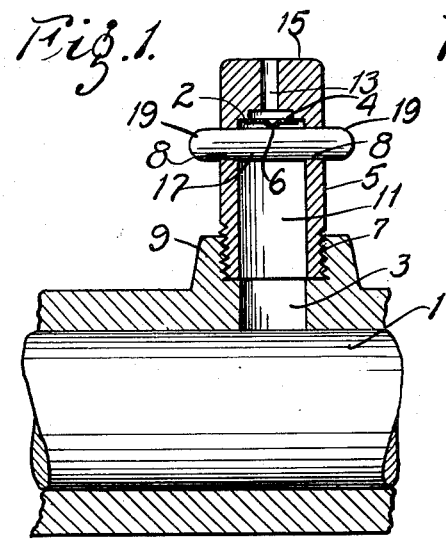
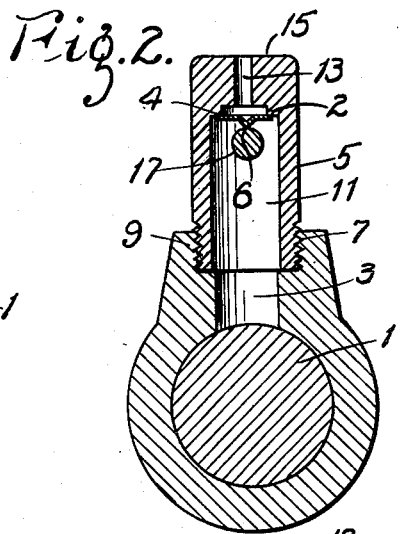
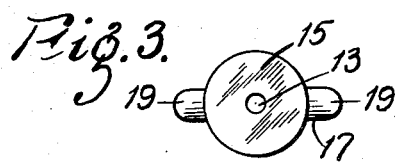
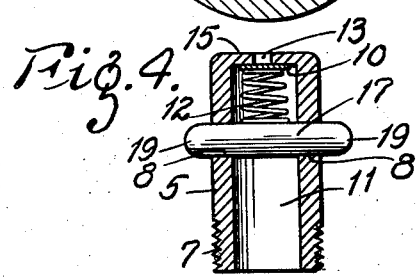
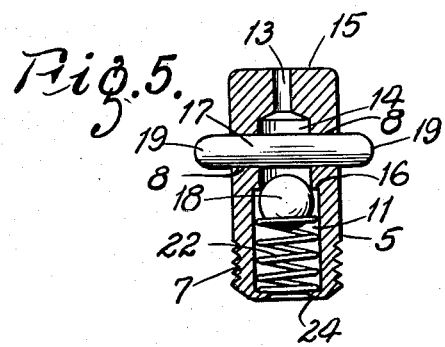

Patented June 27, 1933

1,916,185

UNITED STATES PATENT OFFICE

FRANK S. BARKS, OF ST. LOUIS, MISSOURI, ASSIGNOR TO LINCOLN ENGINEERING COMPANY, OF ST. LOUIS, MISSOURI, A CORPORATION OF MISSOURI

FITTING

Application filed June 17, 1929. Serial No. 371,626.

This invention relates to fittings, and with regard to certain more specific features to fittings for use, for example, with lubricating or dispensing apparatus of the type described in my Patent No. 1,633,304 dated June 21, 1927.

Among the several objects of the invention may be noted the provision of a fitting adapted to receive material from a pressure line and deliver it to a predetermined point, such as a bearing passage, in which improved spring-pressed means is used for positively sealing against leakage of material from a bearing to which the fitting is applied; the provision of a device of the class described which will positively prevent entry of foreign material; and the provision of a device of the class described which is simple to manufacture and install. Other objects will be in part obvious and in part pointed out hereinafter.

The invention accordingly comprises the elements and combiantions of elements, features of construction, and arrangements of parts, which will be exemplified in the structure hereinafter described, and the scope of the application of which will be indicated in the following claims.

In the accompanying drawing in which are illustrated three of various possible embodiments of the invention, Fig. 1 is a cross section showing one form of the invention applied to the bearing;

Fig. 2 is a view similar to Fig. 1 showing another section of the same device taken at right angles to the Fig. 1 section;

Fig. 3 is a plan view of Fig. 1;

Fig. 4 is a sectional view of a fitting removed from its bearing showing an alternative form of the invention; and, Fig. 5 is the same as Fig. 4 except showing another alternative form of the invention.

Similar reference characters indicate corresponding parts throughout the several views of the drawing.

Referring now more particularly to Fig. 1, there is illustrated at numeral 1 a bearing to which leads a communicating passage 3. The purpose of the passage 3 is to deliver material such as grease to the bearing 1. Fitting 5 which comprises the present invention, is screwed into the passage 3.

The fitting 5 comprises a piece of preferably straight, cylindrical form provided with threads 7 for screwing it into a boss or the like 9 forming the end of the passage 3. The fitting is bored from its threaded end to provide an enlarged passage 11, said enlarged passage 11 being met by a relatively small passage 13 communicating from the inlet end of the fitting. The bore of the passage 13 is small enough that, under operating conditions of the machine on which the fitting is located, foreign material will not enter through said passage when the passage is filled with material being delivered to the bearing 1. For instance, a diameter of one-sixteenth inch for the opening 13 has been found suitable.

The inlet end of the fitting 5 is provided with a sealing surface 15 for engagement with a suitable sealing element of a bayonet coupling adapted to be fastened to the fitting.

The upper end of bore 11 is provided with a shoulder 2 against which rests a resilient disc 4 composed preferably of the spring material and engaging or almost engaging said shoulder at the periphery. Thus it is clear that the shoulder forms a seat on which may normally rest the disc 4.

The disc 4 is provided at a preferably central location with an indentation 6 forming a downwardly extending protrusion.

A lateral bore 8 is formed across the relatively large opening 11 for the purpose of receiving with a press fit an intersecting pin 17. The cross bore 8 is so arranged that the indentation or protrusion 6 is intersected by a projection of the same when the disc is unsprung. By driving the pin 17 through the cross bore 8 (there being said relatively tight fitting) the protrusion 6 may be engaged by the pin 17, whereby the disc 4 may be put into tension against the shoulder or seat 2. The ends of the pin 17 are slightly rounded and thus facilitate this function. It is to be understood that the construction may be varied so that the pin merely holds the disc near the seat in an unsprung condition, rather than against the seat in a sprung condition, either form being satisfactory. The disc is fulcrumed on the pin by the protrusion 6. The purpose of the pin 17 is not only to hold the disc 4 in position, but also to provide extensions 19 which are adapted to be engaged by bayonet means on a coupling. The straight cylindrical form further adapts the device for application of a bayonet fitting.

The type of coupling that I prefer is shown in my United States Patent 1,767,426. The coupling per se will not be described in detail herein, inasmuch as the present invention regards the fitting itself.

In operation, the bayonet slots of the coupling are applied to the extensions 19, the coupling fitting over the cylindrical fitting 5. A suitable gasket in the coupling seals the face 15 of the fitting and grease or the like may be forced through the openings 13, 11 and to the bearing 1. In passing through the openings 13, 11 the material unseats the peripheral portions of the disc if they are sprung against the seat. If they are not sprung tightly against the seat the material merely springs the edge of the disc so as to provide increased area of passage during flow. Suitable external pressure forces the material into the bearing or bearings against frictional resistance. When the coupling is removed from the fitting 5 the disc springs back to its seating position or near-seating position, so as to prevent reverse movement of the material out of the fitting. It is to be understood that if a disc does not actually seat under tension that any tendency of the material to move outwardly will actually seat the disc.

In Fig. 4 is shown a form in which there is more space between the opening 13 and the pin 17. In this form a flat disc 10 seats behind the opening 13 and is there normally held by the spring 12 reacting against the pin 17. The action of this form is that the disc will unseat against the spring pressure while material is supplied under pressure to the opening 13. Reseating is effected automatically by the tension in the spring. It is preferable that the spring be under initial tension when applied to the fitting.

In Fig. 5 is shown an alternative form in which the relatively large bore 11 is provided with a differential portion 14, whereby the shoulder 16 is effected, against which shoulder seats the ball check valve 18. A spring 22 reacts against the ball to force it to a seat at the shoulder 16. This spring reacts against a shoulder 24 which is peened or otherwise deformed into holding position after the spring has been inserted into the opening 11. It is to be understood that the original shape of the shoulder or flange 24 was longitudinally cylindrical and that the deforming operation, if the spring is made long enough originally, will result in compression being effected in the spring so as to normally seat the ball 18.

The ball and its seat are placed on the down-stream side of the pin 17 so that they are as far away as possible from dirt and grit which is apt to gather at the inlet of the fitting.

With a right-angular shoulder 16 such as is shown in Fig. 5, the ball may be arranged to provide a positive seal by giving it a sharp blow or tap before the spring is applied, whereby local pressure breaks down the sharp corner of the shoulder and adapts the seat to the exact shape of the ball.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawing shall be interpreted as illustrative and not in a limiting sense.

I claim:

1. A lubricant fitting comprising a body, means for fastening said body at one end, a relatively large opening in the body leading from said end, a relatively small opening leading from the other end and meeting the large opening, a pin located crosswise of the large opening, a disc adapted to close the small opening having a portion resting directly on said pin.

2. A lubricant fitting comprising a body, means for fastening said body at one end, a relatively large opening in the body leading from said end, a relatively small opening leading from the other end and meeting the large opening, a pin located crosswise of the large opening, a disc adapted to close the small opening having an extension engaging the pin.

3. A lubricant fitting comprising a body, means for fastening said body at one end, a relatively large opening in the body leading from said end, a relatively small opening leading from the other end and meeting the large opening, a pin located crosswise of the large opening, a disc adapted to close the small opening having an extension engaging the pin, said disc and extension comprising an integral spring member.

4. A lubricant fitting comprising a body, means for fastening said body at one end, a relatively large opening in the body leading from said end, a relatively small opening leading from the other end and meeting the large opening, a pin located crosswise of the large opening, a disc adapted to close the small opening having an extension engaging the pin, said disc and extension comprising an integral spring member normally held in tension by said pin to close the small opening.

5. A fitting comprising the body, means for fastening the body at one end, an opening extending into the body from said end, a second opening meeting the first opening and extending from the other end, a disc adapted to block flow through the fitting, a pin located crosswise in the fitting behind the disc, said disc being composed of spring material, and a protrusion thereon for fulcruming the disc on the pin.

6. A fitting comprising the body, means for fastening the body at one end, an opening extending into the body from said end, a second opening meeting the first opening and extending from the other end, a disc adapted to block flow through the fitting, a pin located crosswise in the fitting behind the disc, said disc being composed of spring material, and a protrusion thereon for fulcruming the disc on the pin, said pin being so arranged with respect to the fulcrum that the disc is normally placed in tension so as to be held in closed position.

In testimony whereof, I have signed my name to this specification this 15th day of June, 1929.

FRANK S. BARKS.